Aug. 18, 1959  S. L. ADELSON  2,899,824
DIFFERENTIAL PRESSURE ADJUSTER FOR FLUID FLOW METER
Filed May 3, 1954
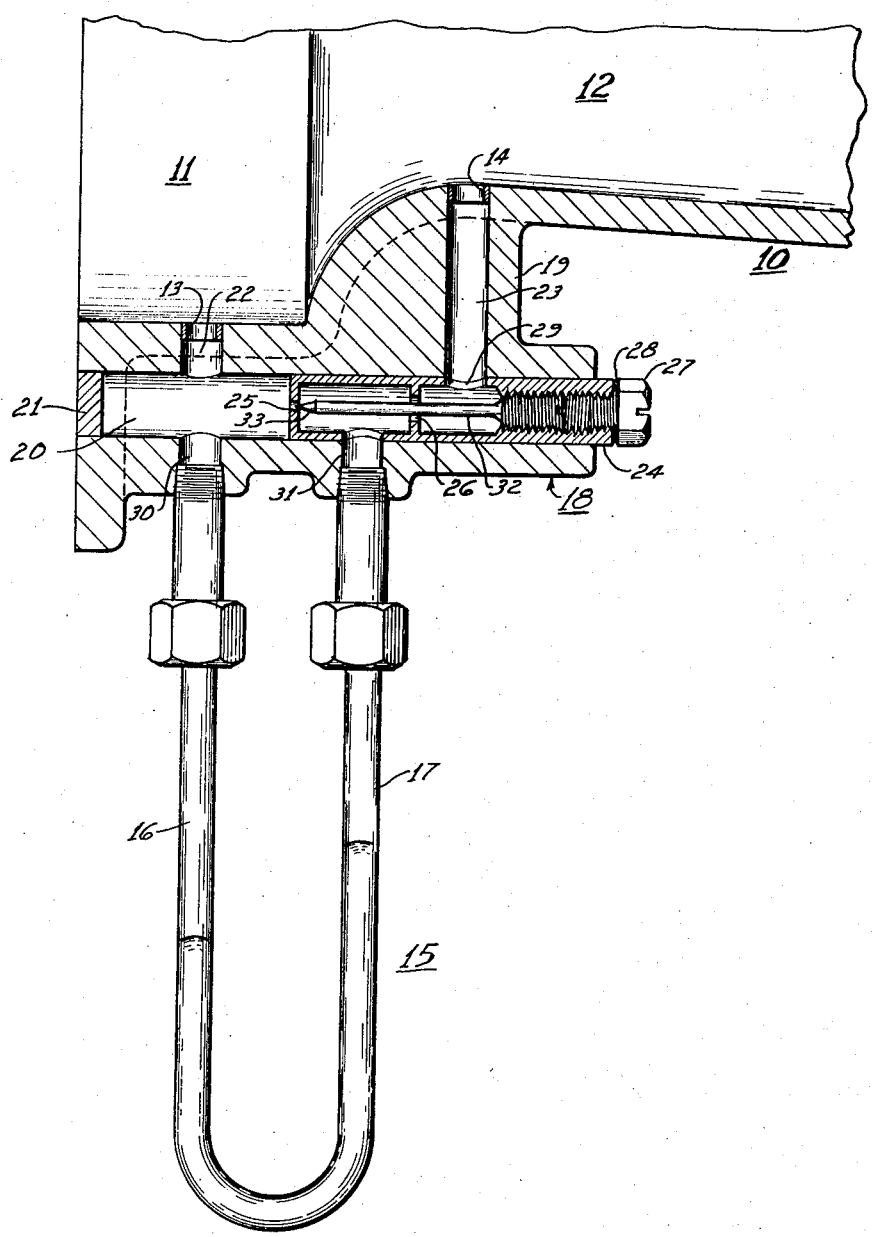

United States Patent Office 2,899,824
Patented Aug. 18, 1959

2,899,824

DIFFERENTIAL PRESSURE ADJUSTER FOR FLUID FLOW METER

Samuel L. Adelson, Tucson, Ariz., assignor to Infilco Incorporated, Tucson, Ariz., a corporation of Delaware Application May 3, 1954, Serial No. 427,175

6 Claims. (Cl. 73—213)

This invention relates to a device for proportionally reducing the differential pressure obtained from a differential pressure producing device.

It is well known in the art that the rate of fluid flow in a conduit may be determined by measuring the differential pressure existing between the inlet and throat sections of a venturi tube, or the differential pressure between sections upstream and downstream of an orifice located in the conduit.

The relation between the flow rate and the differential pressure may be expressed by the following equation:

$$G = \frac{\sqrt{K} C d^2 D^2 \sqrt{H}}{\sqrt{D^4 - d^4}}$$

Where $G$ = the flow rate in gallons per minute
$K$ = a constant (approximately 385.6)
$C$ = the coefficient of discharge (velocity of approach factor omitted)
$D$ = internal diameter of conduit in inches (either inlet diameter of a venturi tube or the diameter of the conduit upstream of an orifice)
$H$ = differential pressure in feet of fluid in the conduit
$d$ = throat diameter of a venturi tube or the diameter of the opening in an orifice plate By inspection of this equation it will be understood that for a given condition of differential head, pipe and throat (or orifice) diameters, the flow rate will depend on the value of C, and vice versa, for a given condition of flow rate, pipe and throat (or orifice) diameters, the differential pressure will depend on the value of C.

It frequently occurs that even though the literature shows what value of C may be used in computing the value of $d$, errors in such computations are made; also, while the proper value of C may be used in the computations, there are times when the actual value of C will be affected by the nature of the installation. In many instances the actual value of the coefficient C is lower than the computed value, and the value of the differential pressure consequently is greater.

It is also well known in the art that the differential pressure obtained from a differential pressure creating device, such as a venturi tube, may exceed the operating range of a differential pressure sensitive device to which it is to be applied.

It is an object of the invention to provide means for adjusting the differential pressure obtained from a differential pressure creating means, such as a venturi tube or an orifice, so that its value will correspond to the then flow rate.

Another object of the invention is to provide a device by means of which the differential pressure obtained from a differential creating device can be proportionally reduced so that it may be applied to a differential pressure sensitive device operating in a lower differential pressure range than said differential pressure.

Another object of the invention is to provide a device of the type referred to which can be readily adapted to an existing installation of a differential pressure producing device.

Another object of the invention is to provide a device of the type referred to which forms an integral part of a differential pressure producing device.

A further object of the invention is to provide a device of the type referred to which can be taken out of operation without being removed from its installed position.

Other objects will become apparent upon consideration of the following detailed description and the claims.

The sole figure of the drawing shows a vertical sectional view of a differential adjuster constructed according to the invention.

The invention will be described for purposes of illustration as applied to a venturi tube installed in a fluid conduit to provide a differential pressure, and a manometer for measuring the differential pressure, but it will be understood that the invention is not limited to use with these particular devices, but that it can be used with other differential pressure creating and responsive devices.

In the drawing a venturi tube is indicated at 10 and has an inlet section 11 having a bushed opening 13 and a throat section 12 having a bushed opening 14.

A manometer 15 has a high pressure leg 16 and a low pressure leg 17.

Interposed between the venturi 10 and the manometer 15 is the differential adjuster 18. The adjuster 18 may comprise a body 19 of any suitable material. A conduit 20 extends through the body 19 and is closed at one end by a plug 21. Passageways 22 and 23 establish hydraulic communication between legs 16 and 17 of manometer 15 and the inlet section 11 and the throat 12 of venturi tube 10, respectively, across the conduit 20.

Located within the conduit 20 may be a closely fitted sleeve 24, as shown. The sleeve 24 has a restriction 25 at one end and a second restriction 26 intermediate its ends. The other end of the sleeve 24 is sealed by means such as a closure 27 and a gasket 28 to prevent leakage of fluid to atmosphere. An opening 29 in the sleeve 24 between the restriction 26 and the closure 27 registers with the passageway 23. An outlet port 30 provides communication between the conduit 20 and the high pressure leg 16 of the manometer 15. A second outlet port 31 in the sleeve 24, located between restrictions 25 and 26, communicates the sleeve with the low pressure leg 17 of the manometer 15.

One end of a stem 32 is threaded into the sleeve 24, and is provided with a screw driver slot, as shown, so that, by removing the closure 27, the stem can be adjusted lengthwise of the sleeve. The other end 33 of the stem 32 is tapered and adapted to enter one of the restrictions 25 and 26 to a variable degree to vary its effective area. The effective area of the other restriction is maintained constant. In the preferred embodiment of the invention shown in the drawing, the stem 32 passes through the restriction 26, and its tapered end 33 enters the restriction 25 to an extent defined by the lengthwise adjustment of the stem 32. In this embodiment the net area of restriction 25, therefore, is variable while the net area of restriction 26 is constant. Obviously, the stem 32 can be made shorter so that its tapered end 33 enters, and varies the area of, the restriction 26. As will become apparent below, the results with regard to the differential adjustment are the same whether restriction 25 or 26 is used for the variable area restriction.

In operation, fluid flows from the inlet section 11 of the venturi tube 10 through opening 13, passageway 22, conduit 20, variable area restriction 25, sleeve 24, second restriction 26, opening 29 of sleeve 24, passageway 23, opening 14, to the throat section 12 of the venturi tube 10. The differential pressure across the restriction 25 is that imposed upon the manometer 15.

The relation between the differential pressure across the restriction 25 and the differential pressure across the inlet section 11 and the throat section 12 of the venturi tube 10 may be expressed as follows:

$$H_1 = P \frac{d_1^4}{D_1^4 + d_1^4}$$

Where $H_1$ = the differential pressure across restriction 25
$P$ = the differential pressure across the inlet and throat sections of the venturi tube 10
$D_1$ = the equivalent diameter corresponding to the net area of the restriction 25
$d_1$ = the equivalent diameter corresponding to the net area of the restriction 26

It is evident from the above equation that, by varying the effective area of the restriction 25 by means of the tapered end 33 of the stem 32, the value of $H_1$ may be made to assume a desired percentage of P. The smaller the effective area of the restriction 25, the greater will $H_1$ be. It will also be clear that, if the tapered end 33 of stem 32 is advanced sufficiently to completely block the restriction 25, $D_1$ becomes zero and $H_1 = P$; that is, the differential pressure across the manometer 15 is that across the inlet section 11 and the throat section 12 of venturi tube 10.

The passageways 22 and 23, the conduit 20, and the bushed openings 13 and 14 of the venturi tube 10 should be appreciably greater than the effective areas of the restrictions 25 and 26, so that the pressure drop due to the flow through them will be very small.

It will now be understood that either of the two restrictions 25 and 26 can be used as the variable area restriction. However, the preferred embodiment of the invention has the advantage that by advancing the tapered end 33 of stem 32 to completely block the variable restriction 25, the differential adjuster can, if desired, be taken out of operation without dismantling it, for example if the coefficient should be found to be correct.

It will be seen that the invention provides very simple and effective means for adjusting the differential pressure obtained from a differential pressure creating device, be it that this differential pressure does not correspond to the actual flow rate, or that the differential pressure sensitive device to which the differential is applied operates within a lower differential pressure range.

It will be obvious that various modifications can be made without departing from the spirit and scope of the invention. It should, therefore, be understood that I do not wish to limit myself to the exact structural details of the device shown herein for purposes of illustration.

I claim:

1. In combination with a venturi tube, a differential adjuster for reducing the sensed pressure difference obtained from said venturi tube so that it corresponds to the true square of the rate of flow, comprising a body affixed to said tube and having a bore forming a conduit, high and low pressure connections to said conduit through unrestricted ports from high and low pressure points of said venturi, said conduit being provided with two orifices, means for adjusting the effective area of one of said orifices, and outlet ports from said conduit adapted for transmitting the reduced differential pressure obtained across said variable area orifice to a differential pressure sensitive device.

2. A differential adjuster for proportionally reducing the differential pressure obtained from a differential pressure creating device in a fluid pipe to correspond to the true square of the rate of flow, said device having a high pressure section and a low pressure section, said adjuster comprising a conduit, means connecting said conduit through an unrestricted port to said high pressure section, means connecting said conduit through an unrestricted port to said low pressure section, a high pressure port and a low pressure port in said conduit adapted to be connected to opposite sides of a differential pressure sensitive device, said conduit being provided with two orifices, one of said orifices being located between said high and low pressure ports and the other between the low pressure port and said connecting means to said low pressure section, and means for varying the effective area of said one orifice.

3. An apparatus for proportionally reducing the differential pressure obtained from a differential pressure creating device to correspond to the true square of the rate of flow, comprising a conduit, said conduit having a high pressure and a low pressure inlet adapted to be connected through unrestricted ports to a differential pressure creating device, a first and a second orifice in said conduit between said inlets, a stem positionable within said conduit and passing through said second orifice and adapted to enter said first orifice, the net area of said second orifice being constant and the net area of said first orifice being adjustable by positioning said stem with respect to said first orifice, and an outlet port from said conduit on each side of said first orifice for transmitting the differential pressure across said first orifice to a differential pressure sensitive device.

4. Apparatus according to claim 3, wherein said stem has a tapered end which enters said first orifice.

5. In combination with a venturi tube, a differential adjuster for reducing the sensed pressure difference obtained from said venturi tube so that it corresponds to the true square of the rate of flow, comprising a closed conduit, inlet means to said conduit from high and low pressure points of said venturi tube, respectively, through unrestricted ports, a high pressure port and a low pressure port in said conduit, an open-ended sleeve fitting snugly in said conduit, means forming a first orifice in said sleeve between said high and low pressure ports, means forming a second orifice in said sleeve between said low pressure port and the inlet means from the low pressure point of the venturi tube, and a stem positionable lengthwise in said sleeve and adapted to modify the effective area of said first orifice, said high and low pressure ports being adapted for connection to opposite sides of a differential pressure sensitive device.

6. In combination with a venturi tube, a differential adjuster for reducing the sensed pressure difference obtained from said venturi tube so that it corresponds to the true square of the rate of flow, comprising a closed conduit, inlet means to said conduit from high and low pressure points of said venturi tube, respectively, through unrestricted ports, means forming two orifices in said conduit between said inlet means, a stem positionable lengthwise of said conduit and adapted to modify the effective area of the orifice adjacent the high pressure inlet means, and means for transmitting the differential pressure obtained across said last mentioned orifice to a differential pressure sensitive device.

References Cited in the file of this patent

UNITED STATES PATENTS

| 790,888 | Ferris | May 30, 1905 |
| 1,217,899 | Barrus | Mar. 6, 1917 |
| 2,038,229 | Martin et al. | Apr. 21, 1936 |
| 2,297,408 | Hardebeck | Sept. 29, 1942 |
| 2,367,176 | Ahlstrom et al. | Jan. 16, 1945 |
| 2,606,573 | Brobeck et al. | Aug. 12, 1952 |
| 2,725,212 | Jensen | Nov. 25, 1955 |

FOREIGN PATENTS

| 708,438 | France | Apr. 28, 1931 |
| 348,860 | Great Britain | May 21, 1931 |